SIGNAL SELECTING CIRCUITS FOR U. H. F. TELEVISION RECEIVERS AND THE LIKE

Filed July 1, 1953

INVENTORS
Leopold A. Horowitz
& David J. Carlson

BY H. C. Newton
ATTORNEY

United States Patent Office 2,702,344

Patented Feb. 15, 1955

2,702,344

SIGNAL SELECTING CIRCUITS FOR U. H. F. TELEVISION RECEIVERS AND THE LIKE

Leopold A. Horowitz, Haddonfield, and David J. Carlson, Haddon Heights, N. J., assignors to Radio Corporation of America, a corporation of Delaware Application July 1, 1953, Serial No. 365,433

8 Claims. (Cl. 250—20)

This invention relates to signal selecting circuits for high frequency signal receiving system and the like, and in particular to signal selecting circuits of the type referred to which are tunable within an ultrahigh frequency (U. H. F.) signal band.

An ultra high frequency (U. H. F.) band of frequencies has recently been allocated for the transmission of television signals. This frequency band, which extends from 470 to 890 megacycles (mc.), will accommodate seventy new television channels (14 to 83). This extension of the available television frequency channels will permit the addition of one or more broadcast channels to many population centers, and to other such centers will permit television signal transmission and reception for the first time. While U. H. F. transmission and reception is of obvious advantage to commercial broadcasters and the public alike, its success is primarily dependent upon the construction of new signal transmitting and receiving equipment and the use of new techniques in the development of this equipment.

Two analogous problems have resulted from this allocation of the new U. H. F. band. The first involves the adaptation of existing V. H. F. equipment so that it may be made responsive to both V. H. F. and U. H. F. signals. The second involves the design of new equipment which is responsive to both V. H. F. and U. H. F. signals. The present invention finds particular utility in the former application, although its use should not be considered exclusive thereto.

To adapt existing V. H. F. receivers for response to U. H. F. signals, different methods and means have been proposed. One of the simplest utilizes well known superheterodyne principles to convert the received U. H. F. signals to comparable V. H. F. signals which are then introduced into the V. H. F. receiver. The conversion equipment basically comprises a signal selecting or input circuit, a local oscillator circuit, a heterodyne mixer circuit, and an output circuit. The signal selecting circuit is tunable within the U. H. F. band of signal frequencies and the local oscillator is tunable over a comparable frequency range. The input signals are mixed with the oscillator signals in the heterodyne mixer and selected intermediate frequency signals are produced and may be made to correspond to the allocated frequency of one of the V. H. F. channels. Since both the signal selecting circuit and the oscillator circuit are generally tunable, a constant frequency difference corresponding to a selected intermediate frequency is maintained.

In designing signal selective input circuits for U. H. F. to V. H. F. converter applications several considerations and requirements are immediately apparent. Initially it is obvious that the signal selecting circuits should preferably be tunable over the entire frequency range or from 470 to 890 mc., in the present example. In addition, the signal selecting circuits should be tunable to pass substantially a 6 mc. frequency band or correspond to the standard V. H. F. bandwidth. The selective circuits should also maintain a bandwidth that is substantially constant over the entire tunable frequency range. Since the bandwidth of the circuits depends essentially on the coupling factor, the circuits should have a substantially constant coupling factor over the tuning range. Preferably this coupling factor should be variable for different applications. The selective circuits should also have a relatively sharp cut-off outside of the passband to minimize various spurious responses. It is also obvious that for use in commercial broadcast receivers, a circuit structure of the above type should be of simple, low cost construction.

In designing selective circuits to meet the requirements outlined above, it was found that new techniques were needed. Because of the ultra high operating frequencies involved, the inductance of the selective circuits must necessarily be small in order that the circuits may be tunable within the operating frequency range. It is because of these small inductance requirements that standard wire-wound inductors have been found to be insufficient and impracticable. To provide the necessary selective circuit inductance a tuning circuit structure, in accordance with the present invention, utilizes fixed strip conductor elements of improved configuration in connection with selective switching means. It is also desirable that the circuit inductance be variable when strip conductor elements are used without physically replacing the elements.

It is accordingly an object of the present invention to provide improved signal selecting circuit means for television receivers and the like which are tunable for signal response over an extended U. H. F. frequency range and include simple, rigid circuit elements adapted for switching control in a compact tuning structure.

It is another object of the present invention to provide improved signal selecting circuit means for high frequency signal receiving systems and the like having a pass-band characteristic that is substantially constant throughout a wide tuning range.

It is a further object of the present invention to provide an improved tuning system for signal converters and receivers having tuned coupled circuits in which the coupling factor is substantially constant over a relatively wide frequency range.

In some cases it may be sufficient if receivers such as for television reception are tunable or made responsive to only two broadcast channels within the U. H. F. band as generally no more than two will be available to most localities. For this purpose two frequency selective input circuits may be provided. Each of these selective circuits may be present and initially tuned to one of the two different frequency channels. For this application some switching means must be provided to switch the desired selective circuit into electrical connection with the remaining circuit components. It is, of course, desirable that the switching means be both simple and reliable, and not introduce undesirable impedance changes at the high operating frequencies. The switching means must in itself provide relatively low impedance values at such frequencies.

Accordingly it is yet another object of the present invention to provide improved frequency selective circuits for signal converter and receiver systems which are tunable over substantially the entire U. H. F. band of frequencies and which may be easily and reliably switched into circuit with other circuit components in a receiver tuning system.

These and further objects of the present invention are achieved by providing a novel physical arrangement of the components of selective circuits of the type described. In general the selective circuits comprise one or more coupled resonant circuits, each of which is tunable to a resonant frequency by means of a variable tuning capacitor of the movable core type. Short, rigid strip conductors provide the tunable circuit inductances and are arranged to be connected directly with the conductive electrode of each of the tuning capacitors. One end of each strip is connected directly with a contact of the selective switching means referred to. To provide controlled coupling between the resonant circuits a shielding member is provided which can be apertured in a desired manner.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
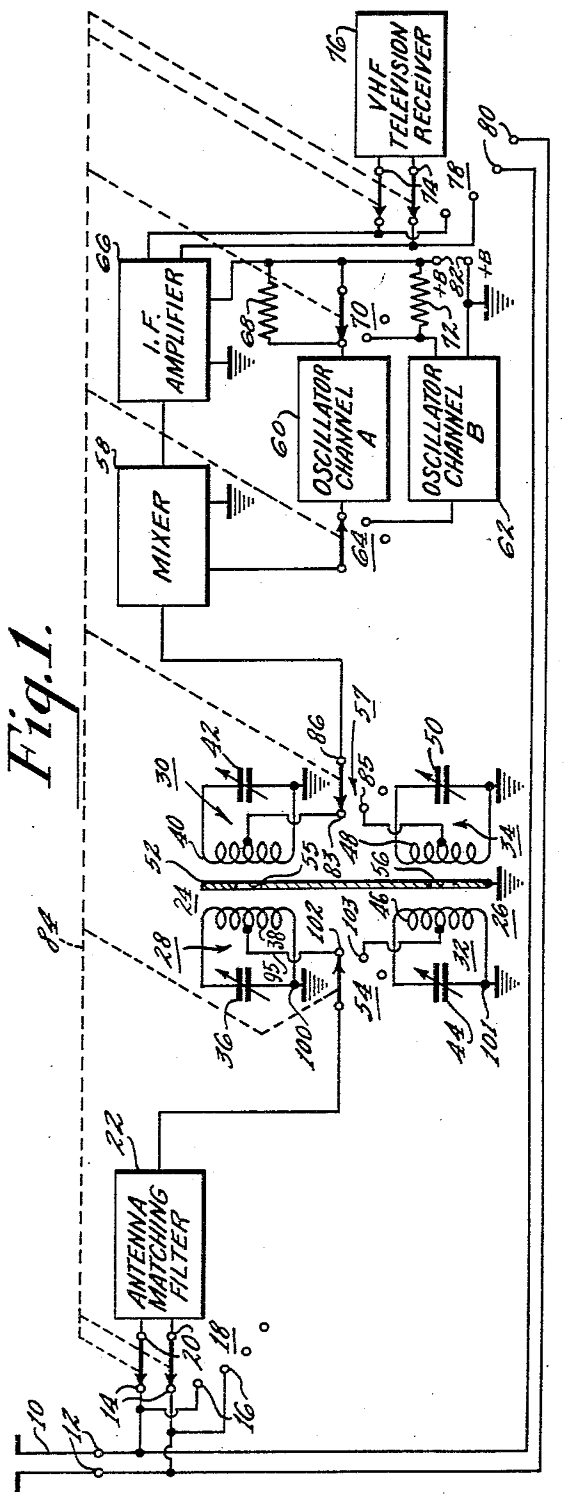
Figure 1 is a schematic circuit diagram, partially in block form, of a frequency converter system embodying the present invention.

Referring now to the drawing wherein like parts are indicated by like numerals throughout the figures, and particularly to Figure 1, an antenna 10 may be assumed to be dimensioned for optimum reception of V. H. F. television signals, yet will also be responsive to signals in the U. H. F. range. The signal output of the antenna 10 is applied to the input terminals 12 of a radio frequency conversion system of the type described in a copending application by D. J. Carlson and W. Y. Pan, Serial No. 316,530, filed October 23, 1952 (RCA 36,323), and assigned to the same assignee as this application. The balanced antenna line terminals 12 are connected to contacts 14 and 16 of a selector switch 18 whose output terminals 20 are connected to an antenna matching filter 22. The antenna matching filter 22 may be of any suitable and well known type for transforming the relatively high impedance of the balanced line appearing at the input terminals 12 to a lower impedance unbalanced line condition for application to the input or selective U. H. F. circuits 24 and 26 which are the subject of the present invention. It has been generally found that circuit operations in the U. H. F. range of frequencies are better accomplished at lower impedance levels than those required in V. H. F. signal applications.

The selective or input network 24 and 26 of Figure 1 are tuned band-pass networks having a bandwidth of substantially 6 mc. Each of the selective networks 24 and 26 comprise two coupled resonant circuits or loops 28—30 and 32—34 respectively, which are separated by a single metallic shielding member 52 which is grounded to the system ground as indicated. Each of the coupling circuits 28, 30, 32 and 34 comprise the combination of a variable tuning capacitor and a tuning inductor and are tunable to resonance over the entire band of operating frequencies by varying the tuning capacitance therein. To permit controlled inductive coupling between the resonant circuits 28 and 30 which comprise the selective network 24, the shield member 52 is apertured as at 55. Similarly, the inductive coupling between the resonant circuits 32 and 34 of the selective network 26 is controlled by an aperture 56 in the shield. It is in this manner, in accordance with the present invention, that the inductive coupling between the resonant loops of each selective circuit may be selectively controlled and varied. Thus by changing the position and/or the size of the apertures the inductive coupling may be increased or decreased in a desired manner. The construction of the selective networks 24 and 26 is of importance and will be considered in more detail hereinafter in connection with the description of the structures shown in Figures 2 and 3.

By way of example only, it may be assumed that the converter system illustrated in Figure 1 is tunable to two predetermined U. H. F. signal channels which may arbitrarily be designated as channels "A" and "B" and that the selective network 24 may be tuned to channel "A" and the selective network 26 may be tuned to channel "B." The coupled resonant circuits 28 and 30 of the selective network 24 are each tuned to a frequency corresponding to channel "A." Similarly the circuits 32 and 34 are tuned to resonance at a frequency corresponding to channel "B". It should be understood that in tuning the various selective circuits to any two predetermined frequencies as above, the tuning is accomplished readily since it is continuously variable by means of the variable capacitors 36, 42, 44 and 50. A selector switch 54 permits application of the signal output of the antenna matching filter 22 to the particular U. H. F. selective network to be utilized. By the selective action of the switch, loading of the output of the antenna matching filter is restricted to but one selected circuit input impedance. To this end, the switch 54 is provided with contacts 102 and 103 which are connected by leads or short conductive elements 95 and 97 to taps on the inductors 38 and 46, respectively, as shown.

The signal output of the selective networks 24 and 26 may be applied to the input of a mixer circuit 58 selectively by means of another selector switch 57, which has terminals 83, 85 connected with taps on the respective inductors 40, 48. A terminal 86 at the output contact of the switch, may serve as a test-point as will be explained in more detail in connection with Figure 3. Heterodyning oscillators 60 and 62 are provided for selective application of oscillator signal energy to the mixer 58 by means of a selector switch 64. In the arrangement shown, the operating frequency of the oscillator 60 would be established in correspondence with U. H. F. channel "A," while that of the oscillator 62 would correspond with U. H. F. channel "B." In accordance with well known heterodyne principles, the signal output of the mixer 58 may, therefore, be defined at any given signal frequency or range of frequencies. The heterodyne signal output of the mixer may be made to coincide with one of the presently assigned V. H. F. television channels. The heterodyne signal produced by the mixer 58 is amplified by an intermediate frequency (I. F.) amplifier 66 and made available to the antenna input terminals 74 of a V. H. F. television receiver 76 through another selector switch 78. In practice, the V. H. F. television channel to which the signal output of the mixer 58 is made to correspond may be a channel not having a local assignment in the area in which the U. H. F. converter is to be used. The selector switch 78 is also provided with a position corresponding to terminals 80 which permits the V. H. F. antenna 10 to be directly connected to the input terminals 74 of the receiver 76.

A further selector switch 70 is provided which permits selective application of +B or operating potential available at terminals 82, to the oscillators 60 and 62. Resistors 68 and 72 apply a low value of protection voltage to the oscillators 60 and 62, respectively, regardless of the position of the selector switch 70. This prevents well known contamination effects on the cathode surface of vacuum tubes used in the oscillator circuits which is produced by the application of heater voltage in the absence of anode voltage. The selector switches 18, 54, 56, 64, 70 and 78 may be connected, as indicated by the dotted line 84, by means of suitable mechanical linkage for unitary operation jointly.

Figure 3:
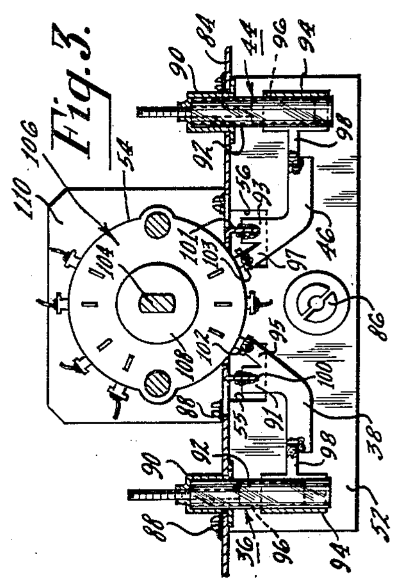
Figure 3 is an end view in elevation and partially in section of the circuit structure of Figure 2 showing further details thereof in accordance with the invention.
Figure 2:
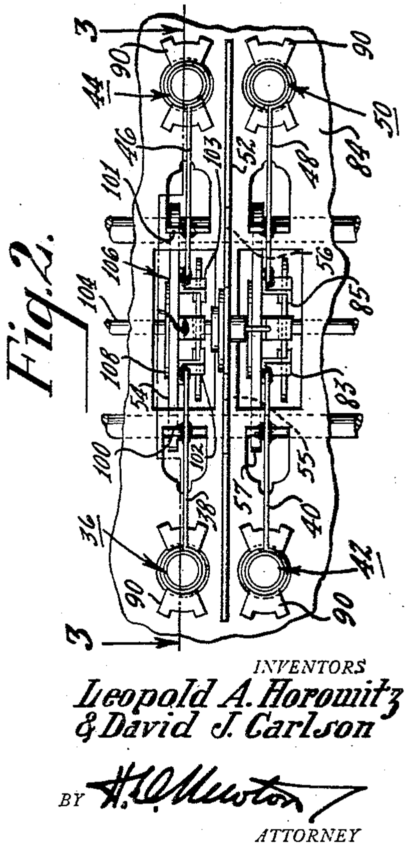
Figure 2 is a bottom view, substantially full size, of the physical structure of certain signal selecting circuits shown in Figure 1, showing their construction in accordance with the present invention.

Referring now to Figures 2 and 3, the metallic shield member or plate 52 is mounted in a position perpendicular or at a right angle to a chassis plate 84 of a frequency converter system such as the one illustrated in Figure 1. Although the shield member 52 may be fastened to the chassis 84 in any suitable manner, the preferred method is accomplished by providing the shield with small projecting tabs 88 (Figure 3) which may be inserted in matching apertures in the chassis and then twisted or crimped to provide a friction fit. After inserting the tabs in the chassis and twisting them in the manner described, the fastening of the shield to the chassis may be strengthened by soldering the two pieces at predetermined points. This expedient also insures good electrical ground points.

The components of the selective networks 24 and 26 are arranged on either side of the shield plate 52 such that each is a substantially equal distance therefrom. The tuning capacitors 36, 42, 44 and 50 for each of the resonant circuits are fastened to the chassis by locking collars 90 on the upper ends of the capacitors which fit through mating apertures in the chassis plate 84. The capacitors 36, 42, 44 and 50 are substantially identical and may be of the tubular type as shown. A hollow tube 92 of insulating material such as glass and having a diameter of approximately ¼ inch is supported by the collars 90. Supported on each of the hollow tubes and coaxial therewith is a thin conductive band 94 which forms the other conductive portion or electrodal element of each of the capacitors. The bands 94 may be of any suitable material, brass being preferred for the present application. The tuning cores or movable electrodes 96 are also made of a conductive material such as brass. Each of the cores 96 is movable axially within the insulating tubes 92 in the manner of plungers to effect capacity variation or adjustment. Movement of the cores or electrodes 96 inside the insulating tubes 92 and relative to the conductive bands or electrodes 94 provide capacity changes between these electrodes. It is in this manner that tuning of each of the resonant circuits is accomplished. One end of each of the cores may be threaded and has a slotted head providing screw driver adjustment of the cores. The conductive bands 94 are provided with integral conductive connector sections 98 in the form of thin flat arms which extend outwardly from the bands 94.

Each of the inductors 38, 40, 46 and 48 of the tunable coupling circuits comprises, in accordance with the invention, a flat strip of conductive material which provides an inductance value suitable to pass predetermined bands of frequencies within the U. H. F. spectrum. The construction of this flat strip inductance is such that it can be reproduced accurately in quantity production. For the present U. H. F. to V. H. F. converter application wherein the selective circuits should preferably be tunable over the entire U. H. F. spectrum an inductance of approximately .02 microhenries is preferred to optimum performance. It has been found that if a brass conductive strip which is plated with silver is used having, by way of example, a thickness of approximately 8/1000 of an inch, the width of the strip should be slightly greater than 1/4 of an inch at the end nearest the capacitor and taper slightly towards its other end. The length of the strip using these dimensions may approximate one inch. The strip is then bent through an angle approximating ninety degrees as shown more clearly in Figure 3, to form an arcuate or "elbow" shaped section.

One end of each of the inductive strips is soldered to the conductive connector sections 98 of each of the conductive bands 94 of the tuning capacitors. To provide a tapping point of the inductive strips the other end of each of the strips is bifurcated by having a V-shaped cut to form two leg portions 91, 95 and 93, 97 for the strips 38 and 46 respectively. By varying the depth of the V cut, the tapping points on the strips and thus the effective inductance of the strips may be varied. For the present application, when using a strip substantially dimensioned as described above, by way of example, the depth of the V cut should be slightly greater than 1/4 of an inch. One of the leg portions 91, 93 of each of the strips is connected to a point of fixed potential or ground for the system. To provide this ground connection a small portion of the chassis 84 may be punched or stamped out to form right angle connecting portions or tabs 100, 101 to which the legs 91, 93 are respectively soldered. The other legs 95, 97 of each of the inductive strips are directly connected to switch terminal contacts 102, 103 of the rotary wafer-type switch 54, and the connections preferably are soldered.

The rotary switches of the converter system are gang-connected for unitary operation. To this end a common control shaft 104 is provided which is connected with insulated rotatable support wafers 108, upon which conventional conductive switch blades (not shown) are supported. The switch terminal contacts 102 are supported on insulated discs 106 which in turn are supported by metallic end or face plates 110, only one of which is shown in the drawing and which may be fastened to the chassis 84 in any suitable manner. The switch assemblies 54 are held in an upright or vertical position between the plates 110 by metallic rods 112 which extend in a horizontal direction between the plates 110 and are supported thereon.

It was pointed out in connection with Figure 1 that the coupling between the tuned circuits of each of the selective circuits may be controlled by providing apertures 55 and 56 in the shield 52. By providing a solid metallic shield and placing apertures at points approximately directly opposite each of the tapping points of the inductive strips, it has been found that the coupling may be made predominantly inductive and substantially constant over the entire U. H. F. band frequencies. Since the bandwidth of the selective circuits depends essentially on the coupling factor, which may, as explained above, be made substantially constant by the provisions of the present invention, the bandwidth may be made substantially constant and uniform over the entire tunable range of frequencies. In addition, it has been found that by providing inductive coupling in accordance with the invention the selective circuits may have a relatively sharp cut-off outside of the pass-band.

Although the position of the apertures may be varied for different applications, thus varying the degree of coupling between the loop circuits, it has been found that optimum performance characteristics are achieved by placing the apertures at a position substantially opposite the tapping points of each of the inductive strips. When using a rectangular steel shield having a height of approximately 1 inch, a length of approximately 3½ inches, and a thickness of approximately 3/100 of an inch, by way of example, the center line of the apertures may be located 1¼ inches from each end of the shield. It has been found that satisfactory characteristics for the selective circuits are achieved by making the apertures approximately 7/16 of an inch long and somewhat less than 5/16 of an inch high, when using circuit structure dimensioned as described above, by way of example.

To provide a test point for the radio-frequency circuits of a frequency converter system of the type illustrated in Figure 1, the terminal 86 is provided. For this purpose, a 1/4 inch diameter hole may be located on the top half of the shield into which a resilient bushing is inserted as shown in Figure 3.

In actual practice the tubular capacitors 36 and 42 are set to a predetermined capacitance value by adjusting the position of the core 96 within the tube 92. In the particular embodiment illustrated the capacitors 36 and 42 of the selective circuit 24 are set to capacitance values such that each of the coupling circuits 28 and 30 are tuned to resonance at a frequency corresponding to channel "A." In a similar manner, the capacitance of the capacitors 44 and 50 of the selective circuit 26 are adjusted so that each of the coupling circuits 32 and 34 are tuned to resonance at a frequency corresponding to channel "B." For covering the entire U. H. F. band, each of the capacitors preferably have a capacity range extending between 1 and 8 micromicrofarads. Thus at 890 mc., when using an inductor having an inductance value of approximately .02 microhenries, the capacitors of the selective circuit which is tuned to this frequency have a capacitance of approximately 1.5 micromicrofarads.

Although designed primarily for the alternate reception of either one of two U. H. F. channels, the converter system constructed in accordance with the provisions of the present invention may be made variable over the entire U. H. F. band by adjusting the selective circuits to resonance at any two signal frequencies over the entire range and making appropriate adjustments of the remaining circuit constants. In the preferred embodiment, however, each of the selective circuits is pre-set to pass signals in a band of frequencies corresponding to a desired one of the U. H. F. channels. It is in this manner that a two-channel converter may be provided which may be tuned to receive signals of one of two preselected channels by a simple switching action.

The selective circuits herein described provide a compact and extremely reliable input stage for frequency converters or receivers of the type described. By constructing the selective circuits in accordance with the teachings of the present invention, a substantially constant bandwidth over the tunable range is insured. Furthermore, the circuit structure described may be manufactured from punched elements at low cost, and is easily adjusted for different circuit applications and operating conditions.

What is claimed is:

1. In a tunable band pass signal coupling system for ultra high frequency operation, the combination of a conductive base, a shielding member comprising a conductive plate connected with said base, a pair of signal conveying coupling circuits on opposite sides of said plate and including a high frequency tuning capacitor and a tuning inductor connected in parallel relationship, each of said inductors comprising a substantially arcuate conductive strip having a body portion and a leg portion integral with said body portion and extending therefrom adjacent one end thereof to provide a tap connection between the ends of said inductor, said one end of each inductor being connected to said base, means connecting the ends of said inductors to said capacitors to provide said parallel circuit relationship, signal input and output circuits, means connecting said leg portions to said last named circuits, and further means including apertures in said shield member for controlling the coupling between said circuits.

2. A coupling circuit as defined in claim 1 wherein a selector switch is mounted on said base and is provided with contacts connected directly with the leg portions of said inductors.

3. A coupling circuit as defined in claim 1 wherein the apertures in the shield member are located between the inductors and opposite the junctions of the leg portions with the body portions thereof.

4. A tunable circuit structure for high frequency signal receiving systems and the like, comprising in combination, a conductive chassis plate and a metallic shield member supported by said chassis plate on one side thereof and at a right angle thereto, means providing first and second selective signal input networks each comprising two coupled resonant circuits located on opposite sides of said shield member, said resonant circuits including flat strip arcuate tuning inductors defining planes parallel with said shield member and substantially equidistance therefrom on either side and connected at one end with the chassis plate, tubular moving core high frequency tuning capacitors having fixed electrodal elements connected with the opposite ends of said tuning inductors and movable electrodal elements connected with the chassis plate, said one end of each inductor being bifurcated to provide a tap thereon, first and second coaxial rotary switch members having a plurality of contacts supported on the opposite side of said chassis and extending through an aperture therein between the inductors of each network, said contacts being connected with said taps on the inductors and said shield member having a pair of apertures adjacent and between opposite pairs of said tuning inductor strips and being each of an area for establishing inductive coupling therebetween which is substantially constant over a predetermined band of frequencies.

5. In a frequency selective signal receiving system, the combination of means providing two selective signal input networks having a common grounded chassis and circuit tuning elements mounted thereon and connected therewith, each of said networks comprising two tuning capacitors of the movable core type and two inductors connected in parallel relationship with the capacitors and inductively coupled, said inductors comprising two spaced substantially parallel arcuate strips of conductive material having bifurcated ends one of which is connected to the chassis and the other of which defines a tap connection, means connecting the opposite end of each of said inductors to an electrode of one of said capacitors, signal input and output circuits, selector switch means connecting the tap connection of each of said inductors to one of said circuits to provide signal selection, and a metallic shielding member disposed between said spaced inductors substantially equidistance therefrom, said shielding member defining a plane parallel with the planes defined by said inductors and having apertures therein between pairs of inductors in the same network, said apertures being located at a point substantially adjacent the bifurcated end portions of said inductors whereby the inductive coupling between the tuned circuits of each network is substantially constant over a predetermined wide frequency band.

6. In a high frequency signal receiving system, the combination with a signal input circuit and a heterodyne mixer circuit, of a pair of signal selecting coupling networks each tunable to a different ultra high frequency signal channel, each of said coupling networks comprising a first and a second spaced tunable signal coupling circuit, each of said coupling circuits comprising a variable capacitor and an inductor comprising a flat arcuate strip of conductive material having a bifurcated end portion providing a tap connection thereon, means connecting said end portion to a source of fixed potential, and means connecting the other end of said inductor to said capacitor, a multiple unit gang controlled switch having a plurality of contacts for alternately connecting one of the coupling circuits of each of said signal selecting networks with said input circuit, means connecting the tap connections provided by said bifurcated end portion of the inductors of each of said coupling circuits with separate contacts of said switch, said switch having means for alternately connecting the other of the coupling circuits of each of said signal selecting networks with said heterodyne mixer circuit, and a shield member disposed between each of said first and second coupling circuits and having a pair of apertures therein located adjacent opposite pairs of said inductors for controlling the inductive coupling between the coupling circuits of each of said networks whereby the bandwidth of said selective networks is maintained substantially constant over a predetermined relatively wide frequency range.

7. A signal selecting circuit structure for ultra high frequency signal receiving systems and the like comprising in combination, a chassis plate of conductive material having spaced apertures therein, a multiple unit rotary selector switch mounted on one side of said chassis plate and extending in part through said apertures, means providing the switch terminals extending from each switch unit through said apertures to the opposite side of said chassis plate, a pair of flat arcuate strip inductors each having one bifurcated end connected with the chassis plate on said opposite side thereof, said inductors being arranged in spaced opposed relation axially along the switch terminals, one leg of each bifurcated end providing a tap connection on each inductor and a direct connection with a switch terminal, a shield plate extending between said pairs of inductors at a right angle to the axis of the switch on said opposite side of the chassis plate and having apertures therethrough in alignment with the bifurcated ends of said inductors to control the inductive coupling therebetween, and a movable core high frequency variable capacitor for each of said inductors having one end grounded to and mounted in said chassis plate and having an insulated electrode connected directly with the opposite end of each of said inductors from the bifurcated end thereby to provide two coupling networks for substantially constant bandwidth response over a predetermined wide frequency range, and means for providing an input circuit and an output circuit connection for said selector switch for selectable connection with said networks.

8. A tunable circuit structure for ultra high-frequency signal conveying systems including a first and a second pair of spaced tunable signal coupling circuits, each of said coupling circuits comprising a variable moving core capacitor and a thin substantially arcuate conductive strip providing the main inductance element thereof connected in parallel relation, one end of each of said strips being bifurcated to provide a tap and a connection therefor, a conductive base on one side of which said capacitors and inductors are mounted in spaced symmetrical configuration on either side of and along an axis, means connecting said connection of each of said strips to said base, a shield member mounted on said base between said pairs of coupling circuits and having a pair of apertures near said base, said apertures being adjacent and between opposite pairs of said conductive strips and of an area for establishing inductive coupling between said coupling circuits which is substantially constant over a predetermined band of frequencies, a multiple unit wafer switch disposed along said axis with contacts connected with the taps on said inductors, and wherein signal input and output circuits are connected with said switch for selective connection with said inductor taps.

References Cited in the file of this patent

UNITED STATES PATENTS

| | | |
|---|---|---|
| 2,355,470 | Root | Aug. 8, 1944 |
| 2,388,049 | Goode | Oct. 30, 1945 |
| 2,405,616 | Silver | Aug. 13, 1946 |
| 2,445,979 | Thompson | July 27, 1948 |
| 2,515,441 | Cohen | July 18, 1950 |
| 2,532,263 | Silvey | Nov. 28, 1950 |
| 2,579,789 | Bussard | Dec. 28, 1951 |